3,251,696
TOPPING MIXES AND THEIR METHOD OF PREPARATION

John J. Miles, Jr., Westwood, Morton Pader, West Englewood, and Stuart W. Thompson, Upper Saddle River, N.J., assignors to Lever Brothers Company, New York, N.Y., a corporation of Maine
No Drawing. Filed Nov. 7, 1961, Ser. No. 150,637
28 Claims. (Cl. 99—139)

The present invention relates to a topping mix, and more particularly to a topping mix for use in preparing whipped toppings.

Compositions which, when mixed with water or milk, have whipping properties similar to whipped cream are known. These compositions take the form of pastes or free-flowing powders. The powders have the advantage of being easy to handle and of undergoing little or no change when stored for long periods of time. Exemplary powders of this type may comprise fat particles covered with dissimilar solid materials, the latter being soluble or dispersible in aqueous media. A typical prior art product may contain about 30–80% fat, 2–35% sugar, 5–30% non-fat milk solids and 3–20% of an emulsifier. These products are generally prepared by forming an aqueous emulsion and subsequently drying the emulsion.

The prior art powdered compositions at best will produce an overrun of from about 200 to about 260%, or else they have too little fat present to have the organoleptic properties of toppings based on whipping cream. In addition, the foams produced from some of the prior art formulations tend to be unstable on standing, that is to say the foam cells agglomerate to form large bubbles, resulting in a coarse, sponge-like structure which is undesirable.

Accordingly, it is an object of the present invention to produce an easily handled, stable, dry topping mix which when reconstituted with water or milk and whipped has a texture and appearance similar to that of natural whipped cream. Another object of the present invention is to provide a powdered fatty composition which, when reconstituted with milk or water and then whipped, yields a large volume of stable whipped product. These and other objects of the present invention will become apparent as the description proceeds.

It has now been found that these objects can be achieved by compositions comprising a base fat, a sweetening agent, a water dispersible protein, and a specific combination of emulsifying agents. The combination of emulsifying agents employed according to this invention consists of a major proportion of a lactylated glycerol ester of a fatty acid selected from the group consisting of palmitic and stearic acids, or mixtures of these acids, with a minor proportion of a material selected from the group consisting of esters of polyhydric alcohols and unsaturated fatty acids and lactylated esters of polyhydric alcohols and unsaturated fatty acids. Preferably, lecithin is also included in the emulsifier mixture.

These ingredients are combined in an aqueous emulsion and the emulsion is spray-dried to give a free-flowing powder having superior handling characteristics. On reconstitution of this powder with water or milk, and whipping, an excellent whipped topping having an overrun of about 300% or more is obtained with a short whipping time.

The whipping properties depend on the unconventional compositions of these mixes; that is, the use of high levels of an emulsifier of the specific type indicated herein. From about 5 to about 10% of glyceryl lactopalmitate or of glyceryl lactostearate can be used. Generally, the higher concentrations of emulsifier will yield shorter mixing times. The use of a glyceryl lactooleate emulsifier or a glyceryl oleate alone was found to give an adequately stable emulsion, but one which had no whipping ability whatsoever. A composition containing a combination of lactopalmitates or lactostearates with one of the unsaturated fatty acid esters, however, gives an unexpected improvement when compared with a composition based on glycerol lactopalmitate alone; overrun is increased to 300% or higher, whipping time is reduced by as much as 50% and the texture of the whipped product is distinctly improved. Such emulsions can be dried by means of a spray dryer or other mild drying procedure, for example a freeze- or vacuum dryer, and, when rehydrated, their whipping ability is essentially unchanged.

Thus, an important feature of the present invention is the use of from about 5% to about 10%, by weight, of the glyceryl lactopalmitates or glyceryl lactostearates in conjunction with from about 0.5% to about 2% by weight, of a glyceryl lactooleate, a glyceryl monooleate or a glyceryl dioleate or mixtures thereof. The combination of these emulsifiers in a topping mix containing about 30 to about 55% of base fat, about 25 to about 45% of sweetening agent, and about 6% to about 11% of protein, serves to acomplish the objects of the present invention. Further textural improvement is obtained by the addition of from about 1% to about 3% of a lecithin to the formula. A suitable lecithin is Alcolec PSH. The lecithin also eliminates an undesirable glossy appearance of the whipped product, improves peaking abiilty, and accelerates melting of the product in the mouth.

The fat in the product imparts the desired creamy mouth feel. Products having a high fat content do not exhibit the crusting-over effect on standing shown by toppings low in fat and high in sugar. Suitable edible fats have a capillary melting point in the range of from about 35° C. to about 40° C. Specific examples of fats which can be used according to this invention include soybean oil having an iodine value of about 80, partially hydrogenated cottonseed oil, coconut oil, and appropriate blends thereof which one skilled in the art may readily devise.

Sodium caseinate is an example of a water-dispersible protein suitable for use according to this invention. This material is believed to act by coating the fat particles during spray drying. On rehydration, the coating acts as a whipping aid as well as a foam stabilizer. Two commercially available forms of sodium caseinate are Griffith's C–258 and Griffith's Kayso D. These materials are relatively soluble at a pH of from 6.0 to 7.5. Topping mixes are preferably prepared in this pH range where the protein, by virtue of its dispersibility in water probably can more readily form a film around the oil globules. At lower pH, e.g., around the isoelectric point of the protein, the protein can be expected to be relatively ineffective. Other suitable water-dispersible proteins such as non-fat milk solids and neutral water soluble soy protein derivatives, which act as coating agents in the preparation of dry fats, are equally satisfactory in the present invention.

The sweetening agent of this invention may be a sugar, preferably sucrose.

The glyceryl lactopalmitates or lactostearates of the present invention are formed by lactylating a mono- and di-glyceride concentrate prepared from sources rich in palmitic and/or stearic acids. Two commercial lactopalmitate preparations which are preferred are Atmul 200 and Drumulse 9169. While the lactopalmitates are preferable, the lactostearates are satisfactory if the formula is slightly modified. For example, a composition containing 10% lactostearate in combination with a 2% level of a lactooleate gives a 330% overrun with a mixing time of 3 minutes and the topping obtained has good texture.

The esters of polyhydric alcohols and unsaturated fatty acids and the lactylated esters of polyhydric alcohols and unsaturated fatty acids which can be employed according to this invention include glyceryl lactooleate, glyceryl monooleate and glyceryl dioleate. These materials as noted above have no effect as a whipping agent when used alone but markedly accelerate whipping, increase overrun and distinctly improve the whipped product texture when used as a supplement to the lactopalmitate and/or lactostearate. The monooleate as obtained commercially contributes a strong off flavor and is therefore preferably not employed. The dioleate is not readily available commercially in adequate purity. An example of a suitable glyceryl lactooleate is Drumulse 9327. This is prepared by lactylating a mono-diglyceride concentrate made from oleic acid.

The use of lecithin as an ingredient of the composition of this invention results in even further improvement in texture. Lecithin materials found suitable for use include Alcolec PMH and Alcolec PSH. The Alcolec PSH disperses more readily in water and forms an oil-in-water type of emulsion while the Alcolec PMH is more lipophilic and favors the opposite type of emulsion.

The formulations based on combinations of emulsifiers in accordance with the present invention can be whipped well both before and after spray-drying. The whipping characteristics of such formulations are the same whether they are prepared as a 60% solids concentrate and diluted to about 35% solids with cold milk for whipping, or spray-dried, diluted with cold milk to 35% solids, and whipped.

In reconstituting the compositions of the present invention, from about 3.8 to about 4.2 fluid ounces (106–117 cc.) of milk or water are added to from about 2.4 to about 2.7 ounces (67–78 g.) of spray-dried powder.

It has also been found to be advantageous, in certain instances, to use a gum such as gum arabic. This material appears to improve the coating effectiveness of the protein, and in the particular spray drier used facilitated collection of the spray-dried materials, i.e., it tended to improve the free-flowing character of the powder.

The following examples illustrate the present invention without, however, limiting the same thereto.

*Example I*

This example illustrates the unexpected results obtained by using as an emulsifier a composition containing glyceryl lactopalmitate with glyceryl lactooleate.

| | Percent composition based on dry wt. |
|---|---|
| Soybean oil, 80 iodine value | 47.75 |
| Sugar (sucrose) | 30.00 |
| Sodium caseinate | 11.00 |
| Atmul 200, a lactopalmitate | 7.00 |
| Alcolec PSH, modified lecithin | 2.00 |
| Alcolec PMH, modified lecithin | 1.00 |
| Drumulse 9327, a lactooleate | 1.00 |
| Gum arabic | 0.25 |

The sample was prepared for spray-drying at 40% solids by dissolving the emulsifiers, including the lecithins, in the oil at 60–70° C., dissolving the sugar, caseinate and gum in water in a separate vessel at 50–60° C. using a high speed mixer, blending the two phases at 60° C. using the high speed mixer, and homogenizing the mixture at 50–60° C. with a homogenizer operated at 3000 p.s.i.g. The emulsion was spray-dried in a Western Precipitation Type N laboratory dryer using 400–500° F. inlet air and 190–200° F. outlet air.

The composition, on reconstitution with fresh milk to 40% solids, whipped in 3 minutes to give an overrun of 290% and had good peaking, a quick melt down in the mouth and a good overall appearance.

The specific processing techniques used in this example are not critical. Any homogenizer capable of producing an emulsion having oil globules with an average diameter no greater than about 5 to about 10 microns would be satisfactory and standard spray-drying equipment applicable to low temperature drying would also be satisfactory.

*Example II*

| Ingredients | Composition on dry wt. basis, percent |
|---|---|
| Oil (80 iodine value hydrogenated soy bean oil) | 45.0 |
| Sugar (sucrose) | 34.5 |
| Sodium caseinate | 9.0 |
| Atmul 200 (lactopalmitate, Atlas Powder Co.) | 7.0 |
| Alcolec PSH (American Lecithin Co.) | 2.0 |
| Alcolec PMH (American Lecithin Co.) | 1.0 |
| Drumulse 9327 (lactooleate, E. F. Drew Co.) | 0.5 |
| Gum arabic | 1.0 |
| | 100.0 |

The above ingredients were combined and spray-dried according to the method outlined in Example 1. The spray-dried, non-greasy, free-flowing powder rehydrated rapidly with cold milk and whipped to a 320% overrun in 2 to 3 minutes using the high speed setting on an electric mixer (Sunbeam Mixmaster). The whipped topping was similar to whipped cream in many respects; it peaked well, melted down quickly in the mouth, and was very stable at room temperature. No shrinkage or syneresis was evident after 8 hours at 75° F.

*Example III*

Three different fats were employed in the formula below and the resulting products were evaluated. All gave essentially the same results. These samples had the following basic composition.

| | Composition on dry wt. basis, percent |
|---|---|
| Fat | 40.5 |
| Sugar | 40.0 |
| Sodium caseinate | 8.0 |
| Atmul 200 | 7.0 |
| Alcolec PSH | 2.0 |
| Alcolec PMH | 1.0 |
| Gum arabic | 1.0 |
| Drumulse 9327 | 0.5 |

The three fats tested were (a) 80 iodine value soybean oil, (b) 80 iodine value cottonseed oil, (c) a coconut oil blend consisting of 70% hydrogenated coconut oil, 15% coconut oil and 15% 80 iodine value soybean oil. The products were prepared as in Example I, and gave essentially the same results as in Example II. Harder and softer oils were also evaluated but gave either too soft or too stiff a product. Thus, a wide range of fats can be used, depending on the textural characteristics desired.

*Example IV*

Flavoring of the product can be carried out either by spray-drying an emulsion containing the flavor or by subsequent addition of dry flavors. A flavored product was prepared from sample (a) of Example III (80 iodine value soybean oil) by adding 0.1% of a compounded vanilla flavor to the aqueous emulsion. This flavor persisted through spray-drying and was present at a satisfactory level in the final product.

Dry fruit flavors can be blended into the dry mix as is shown below using sample (a) of Example III as the base.

| | Composition on dry wt. basis, percent |
|---|---|
| Sample (a), Example III | 86.63 |
| Sucrose I | 12.40 |
| Imitation raspberry flavor (dry) | 0.31 |
| Sodium citrate | 0.31 |
| Citric acid | 0.35 |

This formulation mixed dry and whipped with cold milk (80 g./½ cup milk) yielded a very pleasant fruit flavored topping.

A chocolate flavored topping can also be prepared as the above using the following formulation.

| | Composition on dry wt. basis, percent |
|---|---|
| Sample (a) of Example III | 74.9 |
| Sugar | 21.4 |
| Cocoa powder | 3.7 |

This dry mix, when whipped with milk (90 g./½ cup and 1 teaspoon vanilla) yielded a good chocolate topping.

*Example V*

| | Composition on dry wt. basis, percent |
|---|---|
| Oil (80 iodine value hydrogenated soy bean oil) | 45.0 |
| Sugar | 35.5 |
| Sodium caseinate | 9.0 |
| Atmul 200 (lactopalmitate, Atlas Powder Co.) | 7.0 |
| Alcolec PSH (American Lecithin Co.) | 2.0 |
| Alcolec PMH (American Lecithin Co.) | 1.0 |
| Drumulse 9327 (lactooleate, E. F. Drew Co.) | 0.5 |

The product was prepared as a 60% solids emulsion concentrate by the method outlined in Example I, cooled to 40° F., and diluted with milk to 35% solids for whipping. It yielded a 340% overrun after 3 minutes of whipping. The foregoing example shows that gum arabic is not essential for good whipping.

As many and varied modifications of the subject matter of this invention will become apparent to those skilled in the art from the detailed description given herein, it should be understood that this invention is to be limited only in accordance with the appended claims.

What is claimed is:

1. A whippable topping composition for preparing a whipped topping which is similar to whipped cream and which has a high percent overrun comprising a base fat, a sweetening agent, a water dispersible protein and an emulsifying agent, the emulsifying agent comprising a mixture of lactylated glycerol esters of a fatty acid selected from the group consisting of palmitic and stearic acids, and a lactylated glyceryl oleate.

2. A composition according to claim 1 which contains from about 1% to about 3% lecithins.

3. A whippable topping composition for preparing a whipped topping which is similar to whipped cream and which has a high percent overrun comprising about 45% of hydrogenated soybean oil having an iodine value of about 80, about 34.5% sugar, about 9% sodium caseinate, about 7% glyceryl lactopalmitate, about 2% of a hydrophilic lecithin, about 1% of a lipophilic lecithin, about 0.5% of glyceryl lactooleate and about 1% gum arabic.

4. A whippable topping composition for preparing a whipped topping which is similar to whipped cream and which has a high percent overrun comprising water, a base fat, a sweetening agent, a water dispersible protein and an emulsifying agent, the emulsifying agent comprising a mixture of lactylated glycerol esters of a fatty acid selected from the group consisting of palmitic and stearic acids, and a material selected from the group consisting of esters of glycerol and oleic acid and lactylated esters of glycerol and oleic acid.

5. A composition according to claim 4 which contains a lecithin.

6. A whippable topping composition for preparing a whipped topping which is similar to whipped cream and having an overrun of 340% after 3 minutes of whipping on dry weight basis consisting essentially of about 45% of hydrogenated soybean oil having an iodine value of about 80, about 35.5% sugar, about 9% sodium caseinate, about 7% glyceryl lactopalmitate, about 2% of hydrophilic lecithin, about 1% of lipophilic lecithin and about 0.5% of glyceryl lactooleate.

7. A whipped topping which is similar to whipped cream and having a 320% overrun after 2–3 minutes of whipping provided from a composition on dry weight basis consisting essentially of 45% of hydrogenated soybean oil having an iodine value of about 80, about 34.5% sugar, about 9% sodium caseinate, about 7% glyceryl lactopalmitate, about 2% of hydrophilic lecithin, about 1% of lipophilic lecithin, about 0.5% of glyceryl lactooleate and about 1% gum arabic.

8. A whippable topping composition for preparing a whipped topping which is similar to whipped cream and which has an overrun of at least about 300% comprising about 30% to 55% partially hydrogenated cottonseed oil, about 25% to 45% sucrose, about 6% to 11% sodium caseinate, about 1% to 3% lecithin, about 5% to 10% glyceryl lactopalmitate and about 0.5% to 2% glyceryl lactooleate.

9. A process which comprises forming a composition comprising a base fat, a sweetening agent, a water-dispersible protein and an emulsifying agent, said emulsifying agent being a mixture of lactylated glycerol esters of a fatty acid selected from the group consisting of palmitic acid and stearic acid and a material selected from the group consisting of partial esters of glycerol and oleic acid and lactylated esters of glycerol and oleic acid; and whipping said composition in a liquid medium to provide a whipped topping therefrom which is similar to whipped cream and which has a high percent overrun.

10. A dry powdered whippable topping composition for preparing a whipped topping which is similar to whipped cream and which has a high percent overrun comprising a base fat, a sweetening agent, a water dispersible protein and an emulsifying agent, the emulsifying agent comprising a mixture of (1) lactylated glycerol esters of a fatty acid selected from the group consisting of palmitic and stearic acids and (2) lactylated esters of glycerol and oleic acid.

11. A dry powdered whippable topping composition for preparing a whipped topping which is similar to whipped cream and which has an overrun of at least about 300% comprising by weight about 30% to about 55% fat, about 25% to about 45% sugar, about 6% to about 11% water dispersible protein, about 5% to about 10% of a member selected from the group consisting of glyceryl lactopalmitate and glyceryl lactostearate, about 1% to about 3% lecithin, and about 0.5% to about 2% glyceryl lactooleate.

12. A whipped topping which is similar to whipped cream and having an overrun of at least about 300% provided from a dry powdered composition comprising about 30% to about 55% base fat, about 25% to about 45% sweetening agent, about 6% to about 11% water dispersible protein, about 5% to about 10% of lactylated glycerol esters of a fatty acid selected from the group consisting of palmitic and stearic acids and about 0.5% to about 2% lactylated esters of glycerol and oleic acid.

13. A whipped topping which is similar to whipped cream and having a 320% overrun after 2–3 minutes of whipping provided from a dry powdered composition consisting essentially of 45% of hydrogenated soybean oil having an iodine value of about 80, about 34.5% sugar, about 9% sodium caseinate, about 7% glyceryl lactopalmitate, about 2% of hydrophilic lecithin, about 1% of lipophilic lecithin, about 0.5% of glyceryl lactooleate and about 1% gum arabic.

14. A dry powdered whippable topping composition for preparing a whipped topping which is similar to whipped cream and which has an overrun of at least about 300% comprising about 30% to 55% partially hydrogenated cottonseed oil, about 25% to 45% sucrose, about 6% to 11% sodium caseinate, about 1% to 3% lecithin, about 5% to 10% glyceryl lactopalmitate and about 0.5% to 2% glyceryl lactooleate.

15. A process which comprises forming in a liquid medium an emulsion comprising a base fat, a sweetening agent, a water dispersible protein and an emulsifying agent, said emulsifying agent being a mixture of lactylated glycerol esters of a fatty acid selected from the group consisting of palmitic acid and stearic acid and lactylated esters of glycerol and oleic acid; drying said emulsion to form a powder; reconstituting said powder; and whipping said reconstituted product to provide a whipped topping therefrom which is similar to whipped cream and which has a high percent overrun.

16. A process which comprises emulsifying in a liquid medium about 45% of hydrogenated soybean oil having an iodine value of about 80, about 34.5% sugar, about 9% sodium caseinate, about 7% glyceryl lactopalmitate, about 2% of hydrophilic lecithin, about 1% of lipophilic lecithin, about 0.5% of glyceryl lactooleate and about 1% gum arabic; spray drying said emulsion to form a powder; reconstituting said powder; and whipping said reconstituted product therefrom to provide a whipped topping which is similar to whipped cream and having an overrun of 320% after 2-3 minutes of whipping.

17. An aqueous emulsion whippable topping composition for whipping to prepare a whipped topping which is similar to whipped cream and which has a high percent overrun comprising a base fat, a sweetening agent, a water dispersible protein and an emulsifying agent, the emulsifying agent comprising a mixture of (1) lactylated glycerol esters of a fatty acid selected from the group consisting of palmitic and stearic acids and (2) lactylated esters of glycerol and oleic acid.

18. An aqueous emulsion whippable topping composition for whipping without drying to prepare a whipped topping which is similar to whipped cream and which has an overrun of at least about 300% comprising by weight about 30% to about 55% fat, about 25% to about 45% sugar, about 6% to about 11% water dispersible protein, about 5% to about 10% of a member selected from the group consisting of glyceryl lactopalmitate and glyceryl lactostearate, about 1% to about 3% lecithins and about 0.5% to about 2% glyceryl lactooleate.

19. A whipped topping which is similar to whipped cream and which has an overrun of at least about 300% provided from an aqueous emulsion without any intermediate drying comprising about 30% to about 55% base fat, about 25% to about 45% sweetening agent, about 6% to about 11% water dispersible protein, about 5% to about 10% of lactylated glycerol esters of a fatty acid selected from the group consisting of palmitic and stearic acids and about 0.5% to about 2% lactylated esters of glycerol and oleic acid.

20. An aqueous emulsion whippable topping composition for whipping without drying to prepare a whipped topping which is similar to whipped cream and having an overrun of 340% after 3 minutes of whipping consisting essentially of on a dry weight basis about 45% of hydrogenated soybean oil having an iodine value of about 80, about 35.5% sugar, about 9% sodium caseinate, about 7% glyceryl lactopalmitate, about 2% of hydrophilic lecithin, about 1% of lipophilic lecithin and about 0.5% of glyceryl lactooleate.

21. An aqueous emulsion whippable topping composition for whipping without drying to prepare a whipped topping which is similar to whipped cream and which has an overrun of at least about 300% comprising about 30% to 55% partially hydrogenated cottonseed oil, about 25% to 45% sucrose, about 6% to 11% sodium caseinate, about 1% to 3% lecithin, about 5% to 10% glyceryl lactopalmitate and about 0.5% to 2% glyceryl lactooleate.

22. A process which comprises forming in a liquid medium an emulsion comprising a base fat, a sweetening agent, a water dispersible protein and an emulsifying agent, said emulsifying agent being a mixture of lactylated glycerol esters of a fatty acid selected from the group consisting of palmitic acid and stearic acid and lactylated esters of a glycerol and oleic acid; and whipping said emulsion to provide a whipped topping therefrom which is similar to whipped cream and which has a high percent overrun.

23. A process which comprises emulsifying in a liquid medium about 45% of hydrogenated soybean oil having an iodine value of about 80, about 35.5% sugar, about 9% sodium caseinate, about 7% glyceryl lactopalmitate, about 2% of hydrophilic lecithin, about 1% of lipophilic lecithin, and about 0.5% of glyceryl lactooleate; and whipping said emulsion without drying to provide a whipped topping which is similar to whipped cream and having an overrun of 340% after 3 minutes of whipping.

24. An aqueous emulsion whippable topping composition prepare a whipped topping which is similar to whipped cream and which has a high percent overrun comprising a base fat, a sweetening agent, a water dispersible protein and an emulsifying agent, the emulsifying agent comprising a mixture of (1) lactylated glycerol esters of a fatty acid selected from the group consisting of palmitic and stearic acids and (2) esters of glycerol and oleic acid.

25. An aqueous emulsion whippable topping composition for whipping without drying to prepare a whipped topping which is similar to whipped cream and which has an overrun of at least about 300% comprising by weight about 30% to about 55% fat, about 25% to about 45% sugar, about 6% to about 11% water dispersible protein, about 5% to about 10% of a member selected from the group consisting of glyceryl lactopalmitate and glyceryl lactostearate, about 1% to about 3% lecithins and 0.5% to about 2% of a member selected from the group consisting of glyceryl monooleate and glyceryl dioleate.

26. A whipped topping which is similar to whipped cream and which has an overrun of at least about 300% provided from an aqueous emulsion without any intermediate drying comprising about 30% to about 55% base fat, about 25% to about 45% sweetening agent, about 6% to about 11% water dispersible protein, about 5% to about 10% of lactylated esters of a fatty acid selected from the group consisting of palmitic and stearic acids and 0.5% to about 2% esters of glycerol and oleic acid.

27. An aqueous emulsion whippable topping composition for whipping without drying to prepare a whipped topping which is similar to whipped cream and which has an overrun of at least about 300% comprising about 30% to 55% partially hydrogenated cottonseed oil, about 25% to 45% sucrose, about 6% to 11% sodium caseinate, about 1% to 3% lecithin, about 5% to 10% glyceryl lactopalmitate and about 0.5% to 2% glyceryl oleate.

28. A process which comprises forming in a liquid medium an emulsion comprising a base fat, a sweetening agent, a water dispersible protein and an emulsifying agent, said emulsifying agent being a mixture of lactylated glycerol esters of a fatty acid selected from the group consisting of palmitic acid and stearic acid and partial esters of glycerol and oleic acid and partial esters of glycerol and oleic acid; and whipping said emulsion to provide a whipped topping therefrom which is similar to whipped cream and which has a high percent overrun.

References Cited by the Examiner

UNITED STATES PATENTS

| | | | |
|---|---|---|---|
| 2,864,705 | 12/1958 | Schulman | 99—118 |
| 2,901,355 | 8/1959 | Bangert | 99—139 |
| 2,913,342 | 11/1959 | Cameron et al. | 99—123 |
| 2,954,297 | 9/1960 | Elsesser et al. | 99—94 |
| 2,957,932 | 10/1960 | Radlove et al. | 99—118 |
| 3,098,748 | 7/1963 | Noznick et al. | 99—118 |

A. LOUIS MONACELL, *Primary Examiner.*

ABRAHAM H. WINKELSTEIN, *Examiner.*

M. W. GREENSTEIN, *Assistant Examiner.*